(12) United States Patent
Ishimoto et al.

(10) Patent No.: US 11,834,871 B2
(45) Date of Patent: Dec. 5, 2023

(54) VEHICLE SIDE PART STRUCTURE HAVING OUTSIDE DOOR HANDLE AND RELEASE SWITCH

(71) Applicant: Toyota Jidosha Kabushiki Kaisha, Toyota (JP)

(72) Inventors: Keiji Ishimoto, Toyota (JP); Hiroyasu Harima, Nagoya (JP); Cheng shu Guo, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 36 days.

(21) Appl. No.: 17/392,965

(22) Filed: Aug. 3, 2021

(65) Prior Publication Data

US 2022/0042354 A1 Feb. 10, 2022

(30) Foreign Application Priority Data

Aug. 5, 2020 (JP) .................................. 2020-133276

(51) Int. Cl.
*E05B 81/76* (2014.01)
*E05B 85/10* (2014.01)
(Continued)

(52) U.S. Cl.
CPC .............. *E05B 81/76* (2013.01); *B60J 5/0401* (2013.01); *E05B 81/90* (2013.01); *E05B 85/10* (2013.01)

(58) Field of Classification Search
CPC .......... E05B 81/04; E05B 81/76; E05B 81/77; E05B 81/78; E05B 81/90; E05B 85/10;
(Continued)

(56) References Cited

U.S. PATENT DOCUMENTS 4,348,046 A * 9/1982 Ohya ........................ B60J 1/17
49/164
4,956,943 A * 9/1990 Yamada ................... E05B 85/16
49/502
(Continued)

FOREIGN PATENT DOCUMENTS

CN 102416849 A 4/2012
CN 110454010 A 11/2019
(Continued)

OTHER PUBLICATIONS

Espacenet, machine translation of JP 2014111869 A, generated Apr. 14, 2023 (Year: 2023).*

(Continued)

*Primary Examiner* — Kristina R Fulton
*Assistant Examiner* — Emily G. Brown
(74) *Attorney, Agent, or Firm* — Dinsmore & Shohl LLP (57) ABSTRACT

A vehicle side part structure includes: a side door having a window frame; an outside door handle which is arranged above a lower end rim of the window frame and which is manipulated when the side door is being opened and closed from outside the vehicle; a release switch provided on a press surface of the outside door handle, which is a surface pressed by a user with a finger during an operation of opening the side door, the release switch outputting a release signal upon being manipulated; and a latch actuator which releases latching of the side door by a latch mechanism when the release signal is output.

5 Claims, 8 Drawing Sheets

(51) Int. Cl.
  *E05B 81/90* (2014.01)
  *B60J 5/04* (2006.01)
(58) Field of Classification Search
  CPC ...... B60J 5/0401; B60J 5/0402; B60J 5/0405;
  B60J 5/0406
  See application file for complete search history.

(56) References Cited

U.S. PATENT DOCUMENTS

| | | | | |
|---|---|---|---|---|
| 7,172,240 | B1* | 2/2007 | Kaufman | B60J 1/2002 |
| | | | | 454/131 |
| 9,080,355 | B2* | 7/2015 | Brose | E05B 81/56 |
| 2002/0005016 | A1 | 1/2002 | Menke | |
| 2003/0168882 | A1* | 9/2003 | Naito | B60J 10/78 |
| | | | | 296/146.2 |
| 2006/0005352 | A1* | 1/2006 | Villagrasa | E05B 85/10 |
| | | | | 16/110.1 |
| 2009/0038232 | A1* | 2/2009 | Kimoto | B60J 5/0405 |
| | | | | 49/502 |
| 2010/0117379 | A1* | 5/2010 | Mitchell | E05B 85/02 |
| | | | | 292/201 |
| 2011/0080010 | A1* | 4/2011 | Gouhara | E05B 79/06 |
| | | | | 292/336.3 |
| 2014/0000165 | A1* | 1/2014 | Patel | E05B 81/77 |
| | | | | 292/201 |
| 2015/0330115 | A1* | 11/2015 | Kleve | E05B 81/14 |
| | | | | 292/216 |
| 2016/0145910 | A1* | 5/2016 | Beck | E05B 17/14 |
| | | | | 292/336.3 |
| 2016/0333614 | A1* | 11/2016 | Bendel | E05B 53/001 |
| 2018/0216371 | A1 | 8/2018 | Patel et al. | |
| 2018/0363338 | A1* | 12/2018 | Ichinose | B60R 25/24 |
| 2019/0345745 | A1 | 11/2019 | Murata et al. | |
| 2021/0396052 | A1* | 12/2021 | Yamaguchi | E05B 85/18 |

FOREIGN PATENT DOCUMENTS

| | | | | |
|---|---|---|---|---|
| EP | 1026345 | A1 * | 8/2000 | |
| EP | 1462284 | A2 * | 9/2004 | |
| EP | 2433827 | A1 | 3/2012 | |
| EP | 2433827 | A1 * | 3/2012 | |
| EP | 2620569 | A2 | 7/2013 | |
| FR | 2927925 | A1 * | 8/2009 | |
| JP | 2007177475 | A | 7/2007 | |
| JP | 2012-066722 | A | 4/2012 | |
| JP | 2013-151799 | A | 8/2013 | |
| JP | 2013227804 | A | 11/2013 | |
| JP | 2014111869 | A * | 6/2014 | |
| JP | 2014111869 | A | 6/2014 | |
| WO | WO-2012093220 | A1 * | 7/2012 | ............. B60J 1/12 |
| WO | 2017/098563 | A1 | 6/2017 | |
| WO | WO-2018015865 | A1 * | 1/2018 | ........... B60J 5/0402 |

OTHER PUBLICATIONS

Espacenet, machine translation of JP 2014111869 A (description), generated Apr. 14, 2023. (Year: 2023).*

* cited by examiner

VEHICLE SIDE PART STRUCTURE HAVING OUTSIDE DOOR HANDLE AND RELEASE SWITCH

CROSS REFERENCE TO RELATED APPLICATION

This application claims priority to Japanese Patent Application No. 2020-133276 filed on Aug. 5, 2020, which is incorporated herein by reference in its entirety including the specification, claims, drawings, and abstract.

TECHNICAL FIELD

The present specification discloses a vehicle side part structure including a side door and an outside door handle manipulated when the side door is being opened from the outside.

BACKGROUND

Conventionally, a side door of a vehicle includes an outside door handle for opening the side door from the outside. For example, in JP 2007-177475 A, an outside door handle is provided on a side door of a vehicle at a position below a lower end rim of a window frame. This outside door handle has a lever that is hooked with a finger and pulled outward in the vehicle width direction when the side door is being opened from outside the vehicle. This lever is mechanically coupled to a latch mechanism that latches the side door. By pulling the lever outward in the vehicle width direction, the latching is released.

In recent years, for enhancing designability or for other purposes, there are cases in which an outside door handle is arranged above a lower end rim of a window frame. For example, JP 2014-111869 A suggests providing an outside door handle in a lower rear corner of a window opening surrounded by a window frame. The outside door handle of JP 2014-111869 A also has a lever for pulling the side door outward in the vehicle width direction, and this lever is mechanically coupled to a latch mechanism. By providing an outside door handle above a lower end rim of a window frame as in JP 2014-111869 A, a side door can be configured to have a simple design with little surface unevenness.

When the outside door handle is provided in a lower rear corner of a window opening as in JP 2014-111869 A, there are instances in which visibility from the inside of the vehicle cabin toward a diagonally rear direction becomes limited. In order to avoid this problem, it is necessary to downsize the outside door handle. However, in JP 2014-111869 A, a latch mechanism is mechanically coupled to the lever for pulling the side door outward in the vehicle width direction. According to this arrangement, a mechanical structure must be arranged near the lever, so that drastic downsizing of the outside door handle cannot be achieved.

In view of the above, the present specification discloses a vehicle side part structure having improved designability while maintaining good visibility of the outside of the vehicle from within the vehicle cabin.

SUMMARY

A vehicle side part structure as disclosed in the present specification includes: a side door having a window frame; an outside door handle which is arranged above a lower end rim of the window frame and which is manipulated when the side door is being opened and closed from outside the vehicle; a release switch provided on a press surface of the outside door handle, which is a surface pressed by a user with a finger during an operation of opening the side door, the release switch outputting a release signal upon being manipulated; and a latch actuator which releases latching of the side door by a latch mechanism when the release signal is output.

By providing the outside door handle at a position above the lower end rim of the window frame, the side door can be configured to have a simple design with little unevenness, so that designability can be enhanced. Further, by providing, on the press surface, the release switch for electrically releasing the latching, the outside door handle can be downsized as compared to a case in which a lever for mechanically releasing the latching is provided. As a result, reduction of window glass area can be minimized, and visibility of the outside of the vehicle from within the vehicle cabin can be maintained in a good state.

In the above-described configuration, the outside door handle may include: a base part extending in a direction substantially parallel to a window glass located around the outside door handle; and a cover part which is located outward in a vehicle width direction from the base part and which defines, between the cover part and the base part, a pocket space into which a user's finger is inserted. The press surface may be a surface of the cover part that faces the base part.

According to this arrangement, the press surface and the release switch are located within the pocket space and are not exposed outside. As a result, accidental manipulation of the release switch and consequent unintentional release of the latching can be effectively prevented.

In the above-described configuration, the outside door handle may be arranged in a lower rear corner of a window opening surrounded by the window frame, and the cover part may be mounted to bridge between the lower end rim and a rear end rim of the window frame.

With this arrangement, an area occupied by the outside door handle can be further reduced, and visibility of the outside of the vehicle from within the vehicle cabin can be maintained in a better state.

The vehicle side part structure may further include an emergency switch provided on the outside door handle, the emergency switch being mechanically coupled to the latch mechanism and serving to mechanically release the latching by the latch mechanism upon being manipulated.

By providing the emergency switch, the latching can be released even when a malfunction occurs in the release switch or the latch actuator.

In the above-described configuration, a main component of an operation direction of the emergency switch may be a vehicle vertical direction.

With this arrangement, it is possible to effectively prevent the emergency switch from being accidentally manipulated by a force incurred at a time of hard braking or collision.

The emergency switch may be provided on the outside door handle at a portion adjacent to the window frame.

With this arrangement, a large part of a mechanical structure that connects between the emergency switch and the latch mechanism can be provided outside the window frame; i.e., in a manner concealed between an outer panel and an inner panel of the side door, so that an increase in the size of the outside door handle can be suppressed.

Further, during vehicle travel, a signal path between the release switch and the latch actuator may be disconnected.

With this arrangement, even when the release switch is accidentally operated during vehicle travel due to noise or the like, unintentional release of the latching does not occur.

According to a vehicle side part structure as disclosed in the present specification, improved designability can be attained while maintaining good visibility of the outside of the vehicle from within the vehicle cabin.

BRIEF DESCRIPTION OF DRAWINGS

Embodiment(s) of the present disclosure will be described based on the following figures, wherein.

DESCRIPTION OF EMBODIMENTS

Figure 1:
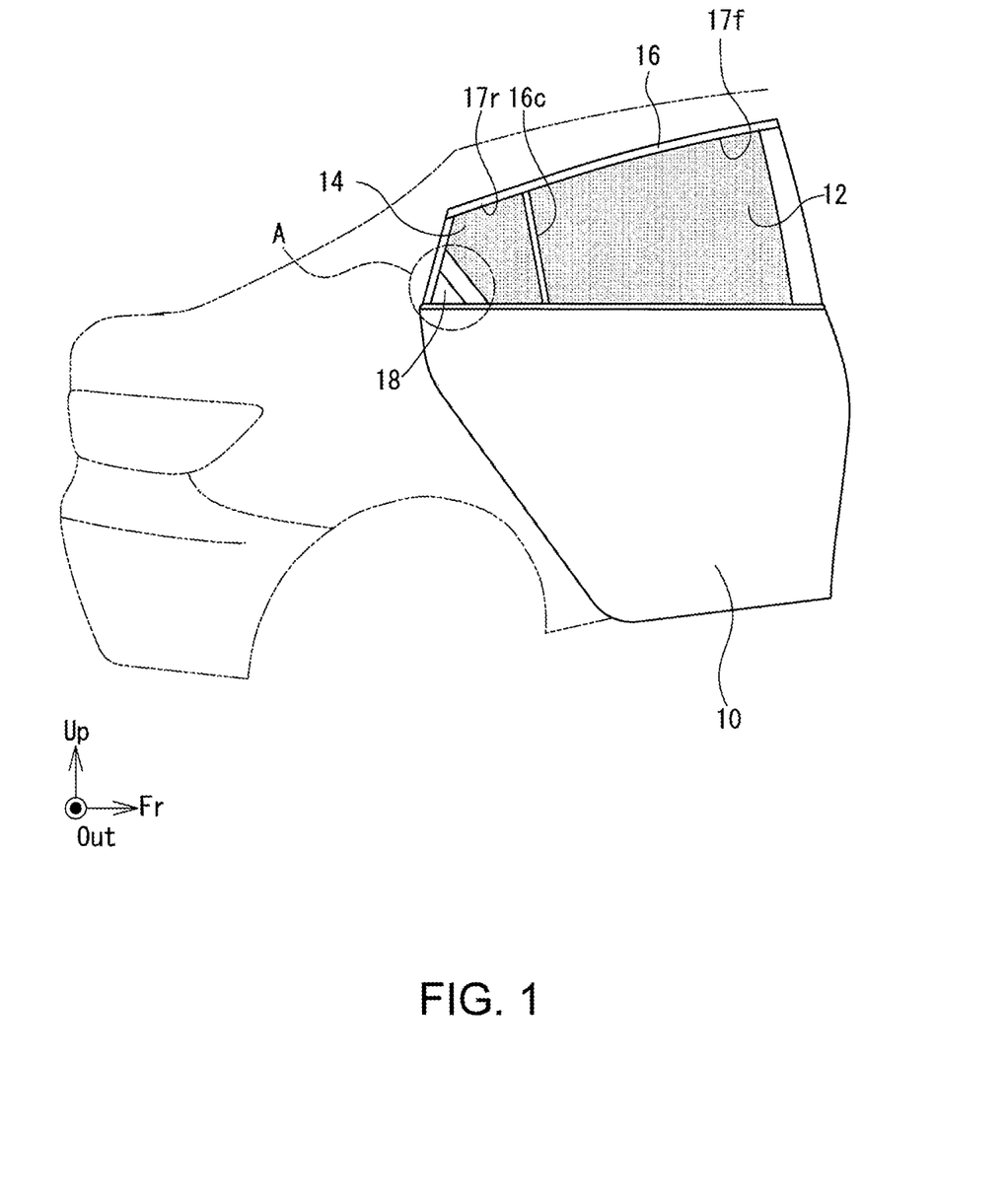
FIG. 1 is a diagram showing a side door of a vehicle as viewed from outside the vehicle.
Figure 2:
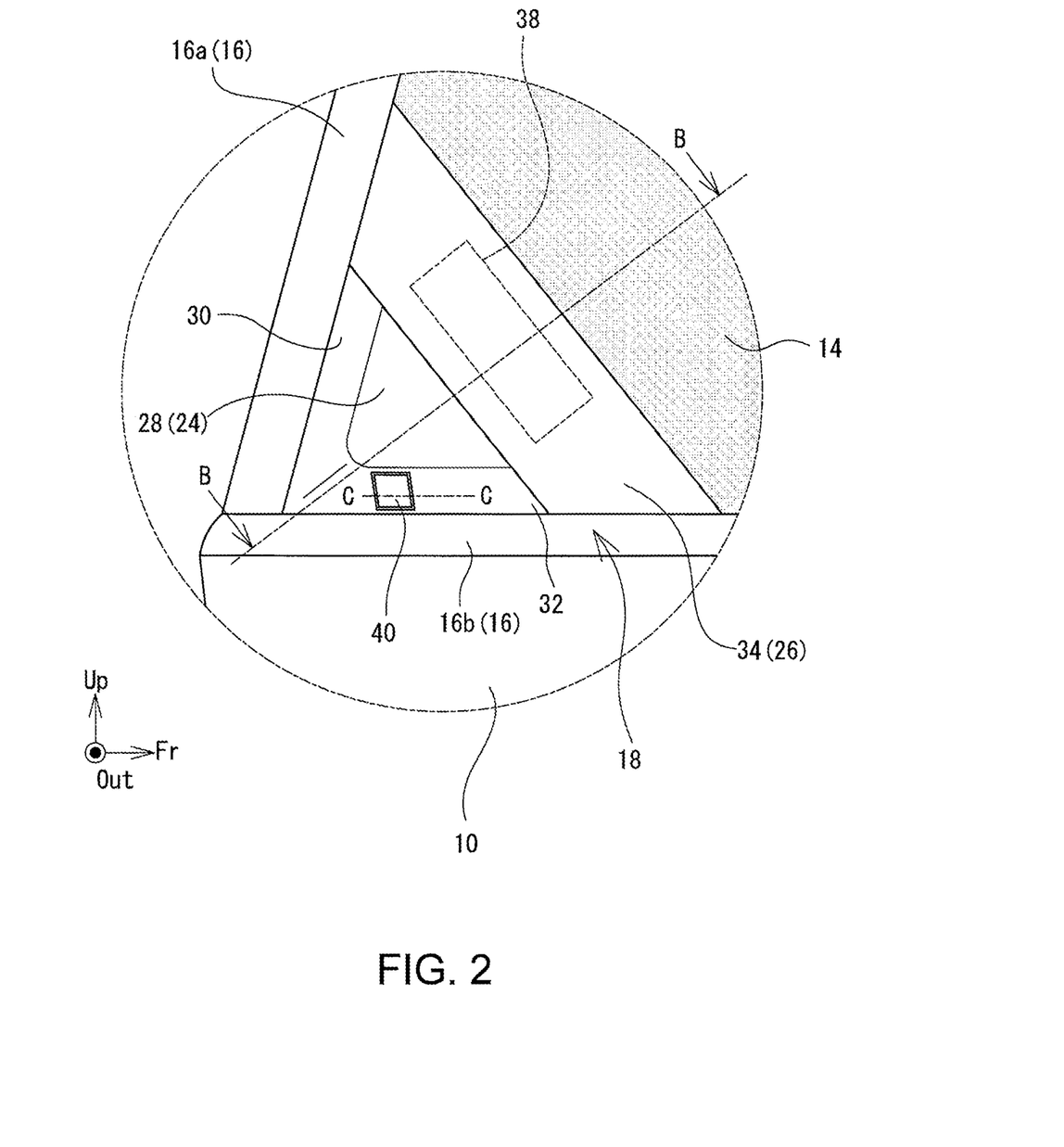
FIG. 2 is an enlarged view of portion A in FIG. 1.

A vehicle side part structure is described below by reference to the drawings. FIG. 1 is a diagram showing a side door 10 of a vehicle as viewed from outside the vehicle. Further, FIG. 2 is an enlarged view of portion A in FIG. 1. In the drawings, "Up", "Fr", and "Out" respectively denote an upward direction of the vehicle, a front direction of the vehicle, and an outward direction in a vehicle width direction.

The side door 10 shown in FIG. 1 is a door installed on a four-door vehicle. In a four-door vehicle, at its side part, two side doors are arranged longitudinally alongside each other. The side door 10 of FIG. 1 is the side door arranged at the rearmost position among the plurality of side doors 10. However, the below-described configuration of the side door 10, in particular the configuration of an outside door handle 18, may also be applied to other side doors. For example, the below-described configuration of the side door 10 may be applied to a side door of a two-door vehicle.

The side door 10 of the present example is opened and closed by swinging about a vertical axis; i.e., by pivoting around a hinged axis extending in the vehicle vertical direction at a front end of the side door 10. The side door 10 includes a window frame 16. The window frame 16 defines a window opening where a window glass is located. The window opening is divided by a middle vertical frame 16c extending in the vertical direction, into a front window opening 17f and a rear window opening 17r located behind the front window opening 17f. The front window opening 17f has arranged therein a rising/lowering window glass 12 capable of being raised and lowered in accordance with user manipulations. The rear window opening 17r has arranged therein a fixed window glass 14 which is fixedly fitted in the window frame 16. In FIG. 1, the window glasses 12, 14 are shown with gray shading.

The side door 10 further includes an outside door handle 18 which is manipulated by a user when the side door 10 is being opened from outside the vehicle. In the present example, as shown in FIGS. 1 and 2, the outside door handle 18 is located at a position above a lower end rim 16b of the window frame 16, or in other words, within the rear window opening 17r. More specifically, the outside door handle 18 is located in a lower rear corner of the rear window opening 17r, with a front end edge (or the cover part 34 described further below) of the outside door handle 18 being arranged in a slanted manner so as to bridge between a rear end rim 16a and the lower end rim 16b of the window frame 16. The overall outside door handle 18 has a substantially triangular shape as viewed from the vehicle width direction. By thus arranging the outside door handle 18 not below the window frame 16 but above the lower end rim 16b of the window frame 16, the side door 10 can be configured to have a simple design with little unevenness, so that a more sophisticated impression can be made on observers.

Figure 3:
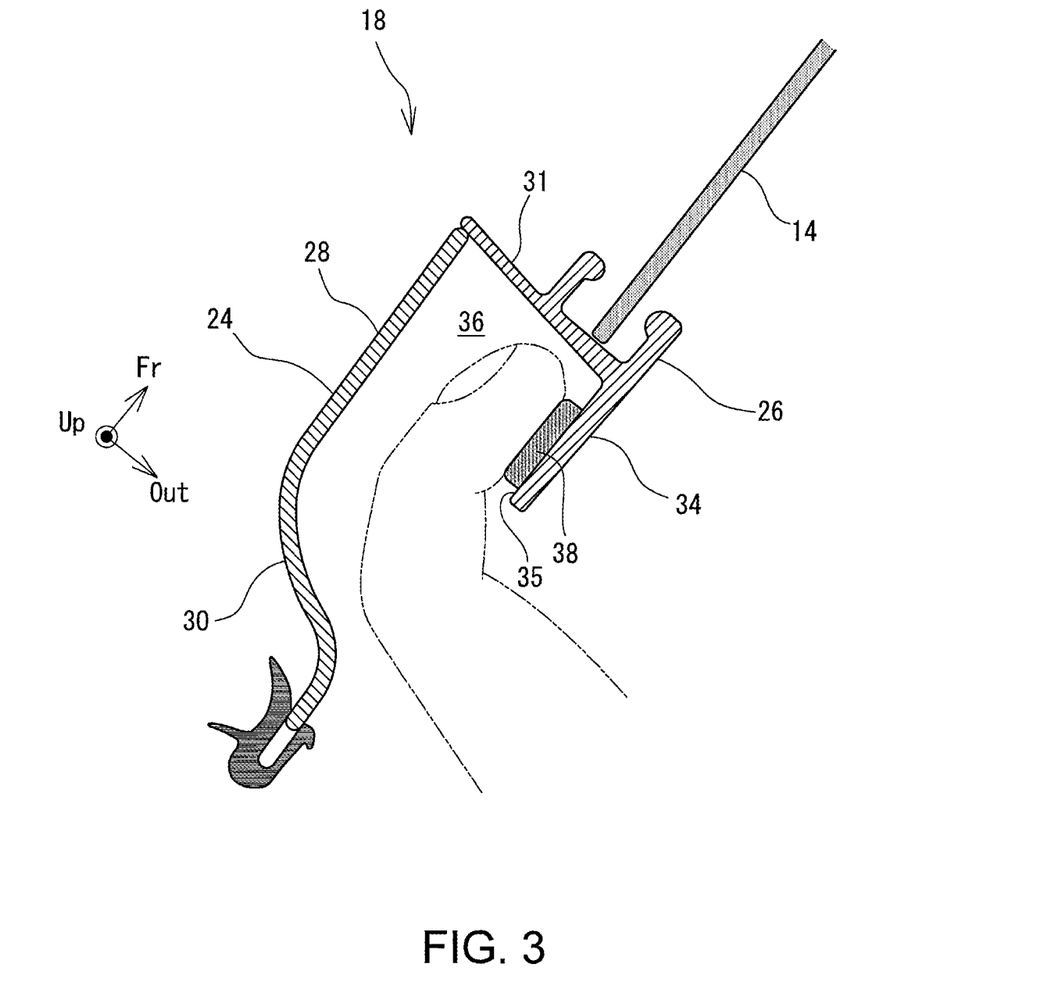
FIG. 3 is a cross-sectional view taken along line B-B in FIG. 2.

Further detailed configuration of the outside door handle 18 is described below by reference to FIG. 3. FIG. 3 is a cross-sectional view taken along line B-B in FIG. 2. As is clear from FIG. 3, the outside door handle 18 includes a first panel 24 and a second panel 26. Each of the first panel 24 and the second panel 26 is a panel member made of resin. The first panel 24 includes: a base part 28 extending in a direction substantially parallel to the fixed window glass 14; a rear part 30 extending outward in the vehicle width direction from a rear end of the base part 28; a placement part 32 (not visible in FIG. 3; see FIG. 2) extending outward in the vehicle width direction from a lower end of the base part 28; and a top part (not shown) extending outward in the vehicle width direction from an upper end of the base part 28, with all of these parts of the first panel 24 being smoothly connected to one another.

The second panel 26 includes a cover part 34 located outward in the vehicle width direction in relation to the base part 28, and a front part 31 extending from a front end of the cover part 34 to a front end of the base part 28. The cover part 34 is substantially parallel to the base part 28, and is shaped so as to extend in line with the fixed window glass 14. Between the cover part 34 and the base part 28, a pocket space 36 into which a user's fingertip is inserted is formed. When opening the side door 10 from outside the vehicle, the user inserts a fingertip into the pocket space 36, and hooks the finger on the cover part 34. While in that state, by pulling the finger toward the user, the side door 10 is pulled toward the user; i.e., in the opening direction. Here, a surface of the cover part 34 that faces the base part 28 functions as a press surface 35 that is pressed by the user with a finger when the side door 10 is being pulled toward the user.

In the present example, a release switch 38 is provided on this press surface 35. The release switch 38 is an electric switch which, when manipulated, outputs a release signal for releasing latching of the side door 10. When the release signal is output, a latch actuator 72 (not shown in FIG. 3; see FIG. 7) is driven to automatically release the latching of the side door 10. By having the release switch 38 arranged on the press surface 35, when the user attempts to open the side door 10, the user naturally ends up manipulating the release switch 38 even without being conscious of the manipulation. As a result, the user can simultaneously perform, without being conscious, the operation of pulling the side door 10 toward the user and the operation of releasing the latching, and the side door 10 can thereby be opened smoothly.

As depicted in dashed lines in FIG. 2, the manipulation surface of the release switch 38 has a wide shape having a long size along a lengthwise direction of the cover part 34. By thus configuring the manipulation surface of the release switch 38 to have a wide shape, the release switch 38 can be manipulated reliably even when there are variations in the shape of the fingertip and in the insertion location.

The reason for providing such a release switch 38 is explained below by making a comparison with conventional art. In general, the side door 10 is latched by a latch mechanism 74 in order to prevent unintended opening. While the configuration of the latch mechanism 74 is not particularly limited, the latch mechanism 74 typically has an engaging member that engages the side door 10 in a closed state. The latching is released when the engaging member is moved in an engagement release direction.

A conventional outside door handle includes a lever for pulling the side door 10 toward the pulling person, and is configured such that the movement of the lever is transmitted to the engaging member via a transmission member. In other words, in a conventional outside door handle, the lever and the latch mechanism 74 are mechanically coupled to each other. According to this arrangement, a mechanical transmission mechanism must be provided around the member (i.e., lever) for pulling the side door 10 toward the pulling person, so that the size of the overall outside door handle tends to become increased.

Here, if the size of the outside door handle 18 becomes increased in a configuration in which the outside door handle 18 is provided above the lower end of the window frame 16 as in the present example, the area of the window glass becomes reduced accordingly, resulting in a degradation in visibility from within the vehicle. In the present example, in order to avoid such a problem, the outside door handle 18 is configured to include the release switch 38, which is an electric switch, instead of mechanical structures. According to this arrangement, in the vicinity of a portion for pulling the side door 10 toward the pulling person; i.e., in the vicinity of the press surface 35, only a signal line for transmitting and receiving electric signals needs to be provided other than the release switch 38. Accordingly, as compared to a case in which mechanical structures are provided, the outside door handle 18 can be downsized. As a result, the window glass can be made to occupy a large area, and good visibility from within the vehicle can be maintained.

In the outside door handle 18 of the present example, an emergency switch 40 is provided in addition to the above-noted release switch 38. This emergency switch 40 is a switch to be manipulated when some malfunction occurs in the release switch 38 or the latch actuator 72 and the latching cannot be released by manipulating the release switch 38. The emergency switch 40 is mechanically coupled to the latch mechanism 74 that latches the side door 10, and a manipulation force applied to the emergency switch 40 is mechanically transmitted to the latch mechanism 74 via a transmission mechanism (such as a cable).

In the present example, the emergency switch 40 is arranged on the outside door handle 18 at a portion adjacent to the window frame 16, or more specifically, on the placement part 32 of the first panel 24. The placement part 32 is a part that serves as a lower end face of the outside door handle 18, and slopes upward of the vehicle as the placement part 32 extends inward in the vehicle width direction. By thus arranging the emergency switch 40 at a position adjacent to the window frame 16, a large part of the mechanical structure mechanically coupled to the emergency switch 40 can be provided outside the window frame 16; i.e., in a manner concealed between an outer panel and an inner panel of the side door 10. As a result, even when the emergency switch 40 is provided, it is possible to avoid a considerable increase in the size of the outside door handle 18.

By moving the emergency switch 40 in a predetermined manipulation direction, the latching is released. In the present example, the main component of the manipulation direction of the emergency switch 40 is the vehicle vertical direction. According to this configuration, accidental manipulation of the emergency switch 40 can be effectively prevented. Specifically, when a hard brake is applied or a collision with an obstacle occurs, the vehicle tends to be subjected to a force in the vehicle longitudinal direction or in the vehicle width direction. For this reason, if the manipulation direction of the emergency switch 40 is the vehicle longitudinal direction or the vehicle width direction, there are risks that a force applied due to hard braking or collision may cause accidental operation of the emergency switch 40. In contrast, since a force in the vehicle vertical direction is not easily applied to the vehicle, by configuring such that the main component of the manipulation direction of the emergency switch 40 is the vehicle vertical direction, accidental manipulation of the emergency switch 40 can be effectively prevented.

Figure 4:
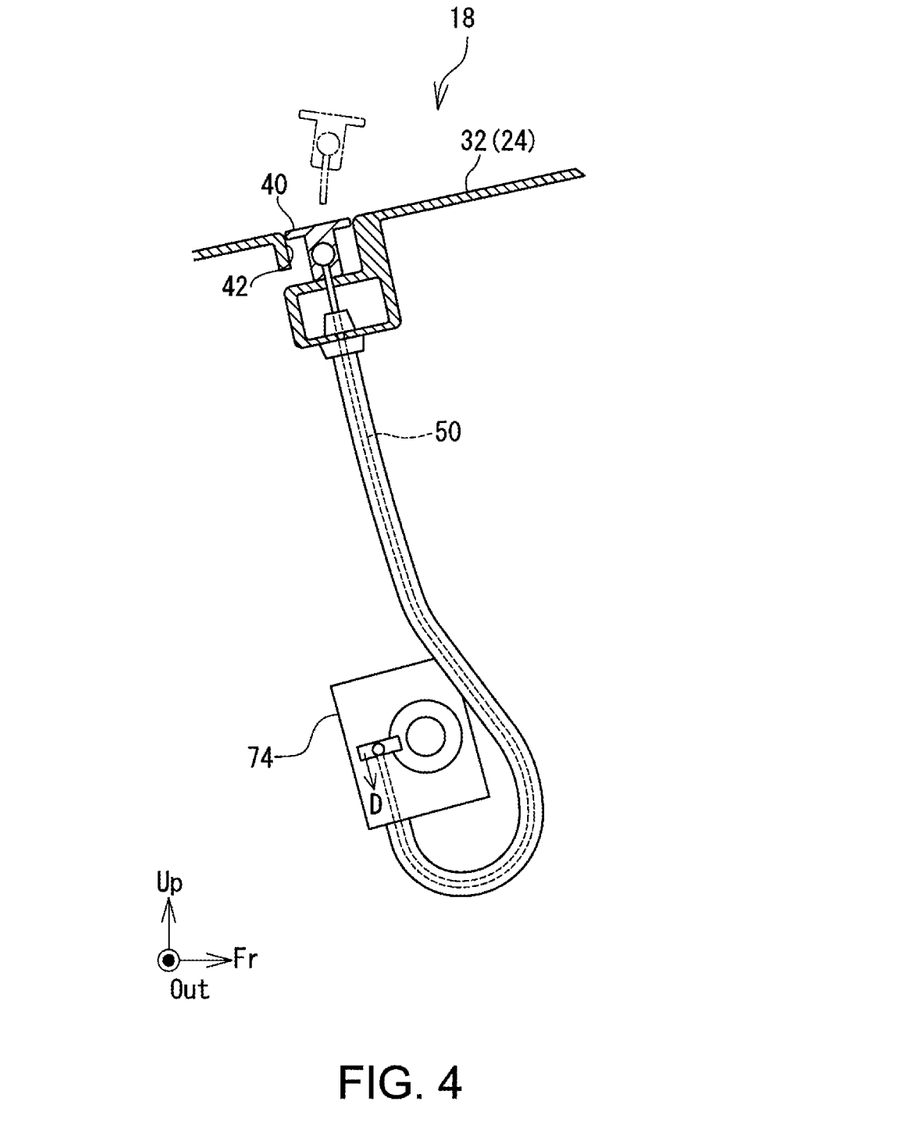
FIG. 4 is a diagram showing an example configuration of an emergency switch.

The emergency switch 40 as noted above is not particularly limited so long as the emergency switch 40 can mechanically release the latching by the latch mechanism 74 upon being manipulated. Accordingly, the emergency switch 40 may be configured as shown in FIG. 4. FIG. 4 is a diagram showing a vertical cross-section taken along line C-C in FIG. 2, and illustrates an example configuration of the emergency switch 40. In FIG. 4, the emergency switch 40 is arranged within a placement hole 42 formed in the placement part 32, and is mechanically connected to the latch mechanism 74 via a transmission cable 50. When the transmission cable 50 is pulled in the release direction D, the latching by the latch mechanism 74 is released. In this arrangement, when the emergency switch 40 is pulled upward as depicted in double-dot dash lines, the transmission cable 50 is pulled in the release direction D and the latching is released.

Figure 5:
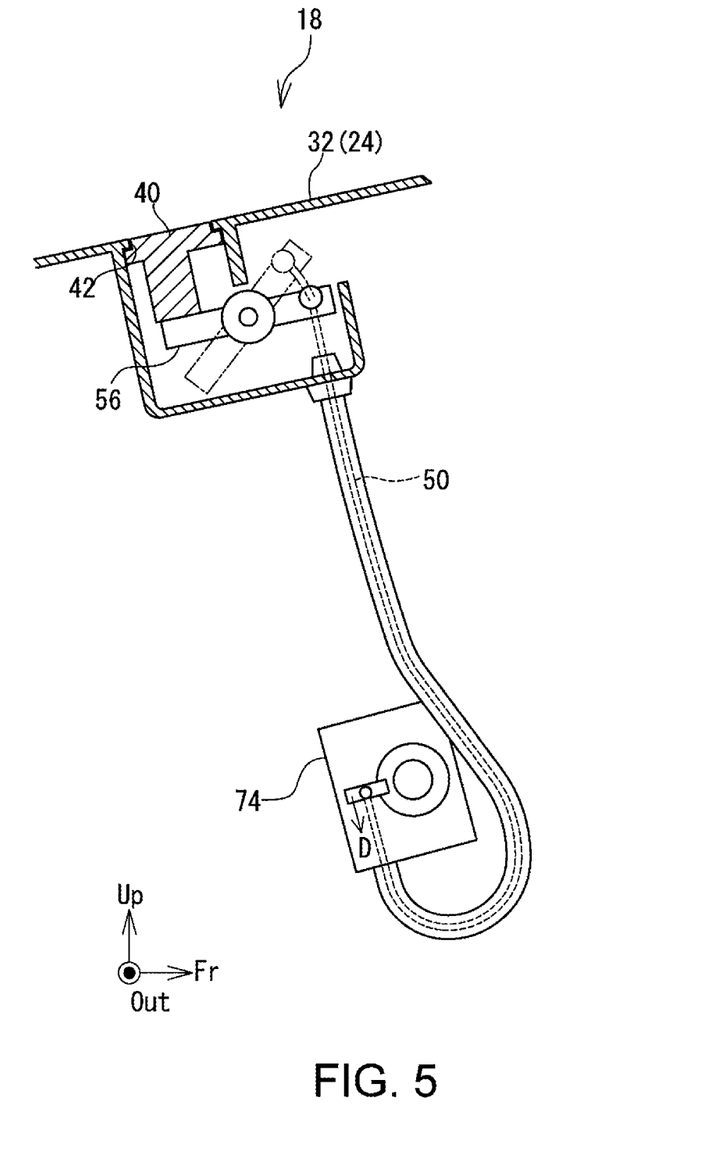
FIG. 5 is a diagram showing another example configuration of the emergency switch.

The emergency switch 40 may alternatively be configured as shown in FIG. 5. In FIG. 5, the emergency switch 40 is arranged within the placement hole 42 formed in the placement part 32. Beneath the emergency switch 40, there is provided a bell crank 56 which is swingable about a pivot axis. One end of the bell crank 56 is in contact with a lower end of the emergency switch 40, while the other end of the bell crank 56 is connected to the transmission cable 50. The leading end of the transmission cable 50 is mechanically connected to the latch mechanism 74. When the transmission cable 50 is pulled in the release direction D, the latching by the latch mechanism 74 is released. In this arrangement, when the emergency switch 40 is pushed downward, the other end of the bell crank 56 and hence the terminal end of the transmission cable 50 are moved upward as depicted in double-dot dash lines, and the transmission cable 50 is pulled in the release direction D. As a result, the latching is released.

Figure 6:
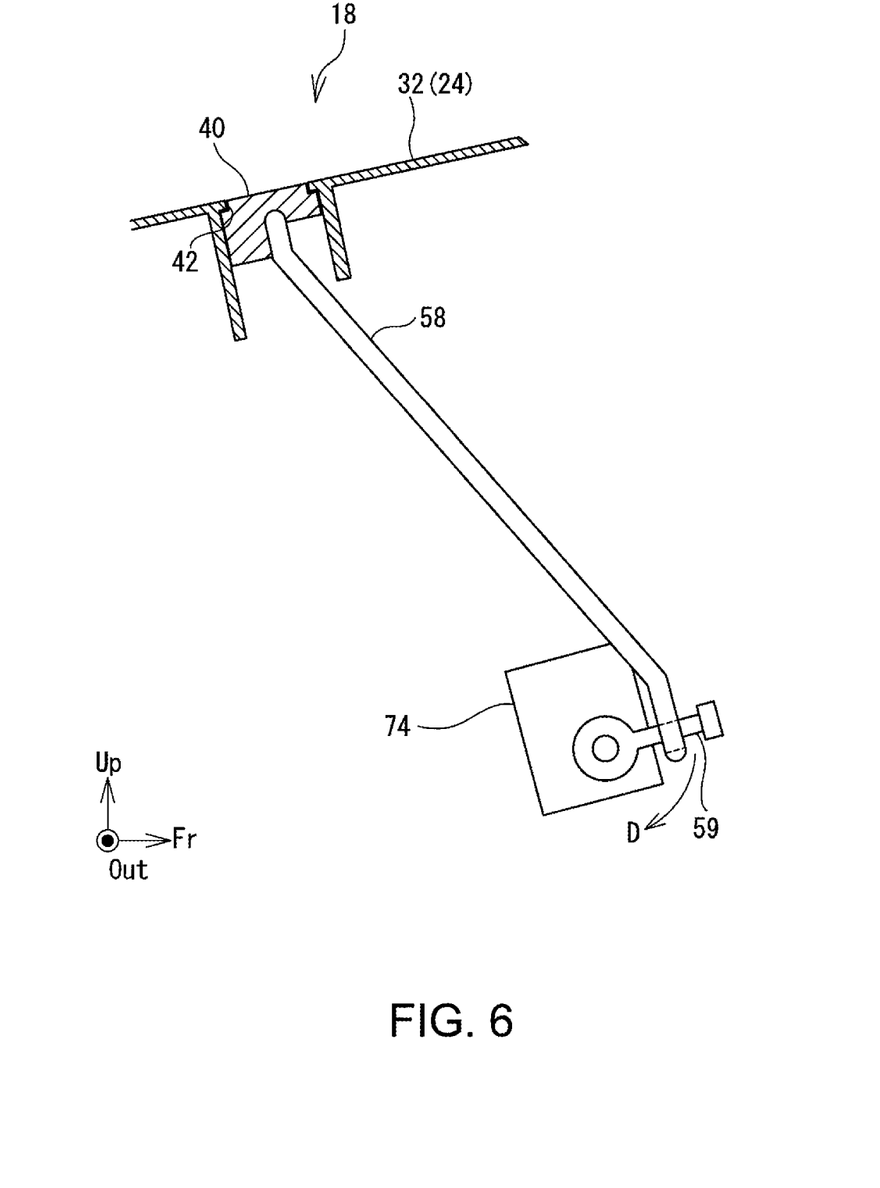
FIG. 6 is a diagram showing a further example configuration of the emergency switch.

The emergency switch 40 may alternatively be configured as shown in FIG. 6. In FIG. 6, the emergency switch 40 is arranged within the placement hole 42 formed in the placement part 32. To a lower end of the emergency switch 40, a transmission rod 58 is secured. At the other end of the transmission rod 58, a through hole is formed, and a swing lever 59 is inserted through this through hole. When the swing lever 59 swings in the release direction D, the latching by the latch mechanism 74 is released. In this arrangement, when the emergency switch 40 is pressed downward, the transmission rod 58 is also moved downward, and the swing lever 59 swings in the release direction D. As a result, the latching is released.

By providing an emergency switch 40 that releases the latching by mechanically transmitting its manipulation movement to the latch mechanism 74 as described above, the side door 10 can be opened from outside the vehicle even when the release switch 38 or the latch actuator 72 does not operate due to an electrical problem.

Figure 7:
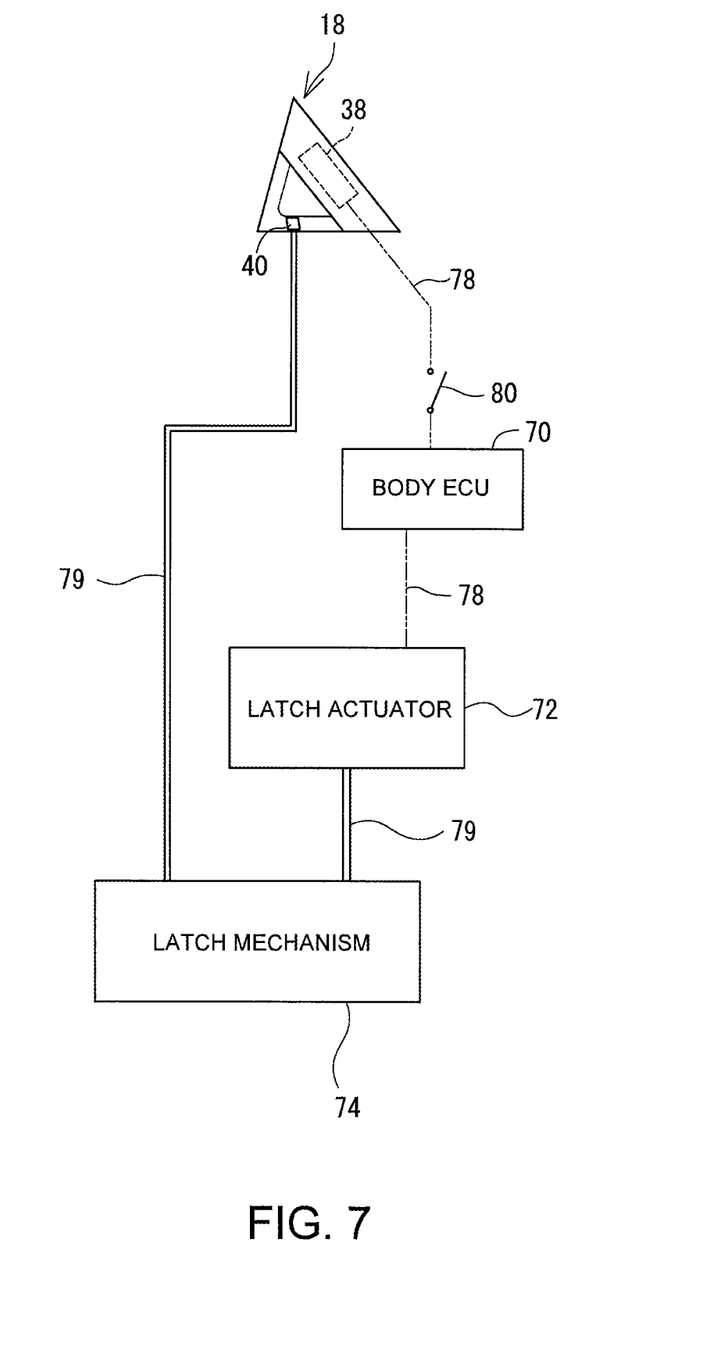
FIG. 7 is a block diagram showing a configuration related to release of latching of the side door.

Next, release of the latching of the side door 10 is described below by reference to FIG. 7. FIG. 7 is a block diagram showing a configuration related to release of the latching of the side door 10. As already mentioned above, the side door 10 is latched by the latch mechanism 74 in order to prevent unintended opening.

In the present example, in order to release the latching by the latch mechanism 74 using electrical drive, the release switch 38 and the latch actuator 72 are provided. As described above, the release switch 38 is an electric switch provided on the press surface 35, which is a part of the cover part 34 of the outside door handle 18. The release signal output from the release switch 38 is input into a body ECU 70 via a signal line 78. The body ECU 70 is a computer including a processor and a memory, and controls electric operations related to the latching. Upon receiving the release signal, the body ECU 70 generates and outputs a drive signal for driving the latch actuator 72.

The latch actuator 72 is an actuator which includes an electric drive source and which serves to drive, using motive power of this drive source, the engaging member of the latch mechanism 74 in a direction of releasing the engagement. As the drive source of the latch actuator 72, it is possible to use, for example, a motor, an electromagnetic cylinder, an air cylinder, a pneumatic cylinder, or the like. The latch actuator 72 is connected to the latch mechanism 74 via a mechanical motive-power transmission member 79 such as a cable, and is configured such that movement of the latch actuator 72 is transmitted to the engaging member of the latch mechanism 74. For example, the latch actuator 72 may include a motor, a bobbin which is rotated in a forward direction by forward rotation of this motor, a cable, and an urging member. In this arrangement, one end of the cable is secured to the bobbin, while the other end is fastened to the latch mechanism. Rotation of the bobbin in the forward direction causes the cable to be wound onto the bobbin. The urging member urges the bobbin in a reverse rotation direction. It may be configured such that, when the bobbin overcomes the urging force of the urging member and rotates in the forward direction in accordance with forward rotation of the motor, the cable is wound and the latching by the latch mechanism is released.

A relay 80 for connecting and disconnecting a signal path between the release switch 38 and the latch actuator 72 is provided between these two elements. The body ECU 70 checks a travel state of the vehicle as needed, and opens the relay 80 while the vehicle is traveling. Accordingly, during vehicle travel, the signal path between the release switch 38 and the latch actuator 72 is disconnected. With this arrangement, even when the release signal is accidentally output from the release switch 38 due to noise or the like during vehicle travel, unintentional release of the latching can be reliably prevented. Here, while in the example of FIG. 7, the relay 80 is provided between the release switch 38 and the body ECU 70, the relay 80 may alternatively be provided between the body ECU 70 and the latch actuator 72.

Further, as described above, the emergency switch 40 is also provided in the outside door handle 18 of the present example. The emergency switch 40 is mechanically coupled to the latch mechanism 74 via the motive-power transmission member 79, which may be, for example, the transmission cable 50 or the transmission rod 58, and a movement applied to the emergency switch 40 is transmitted to the latch mechanism 74. By providing the emergency switch 40, the latching can be released even when a malfunction occurs in the release switch 38 or the latch actuator 72.

Figure 8:
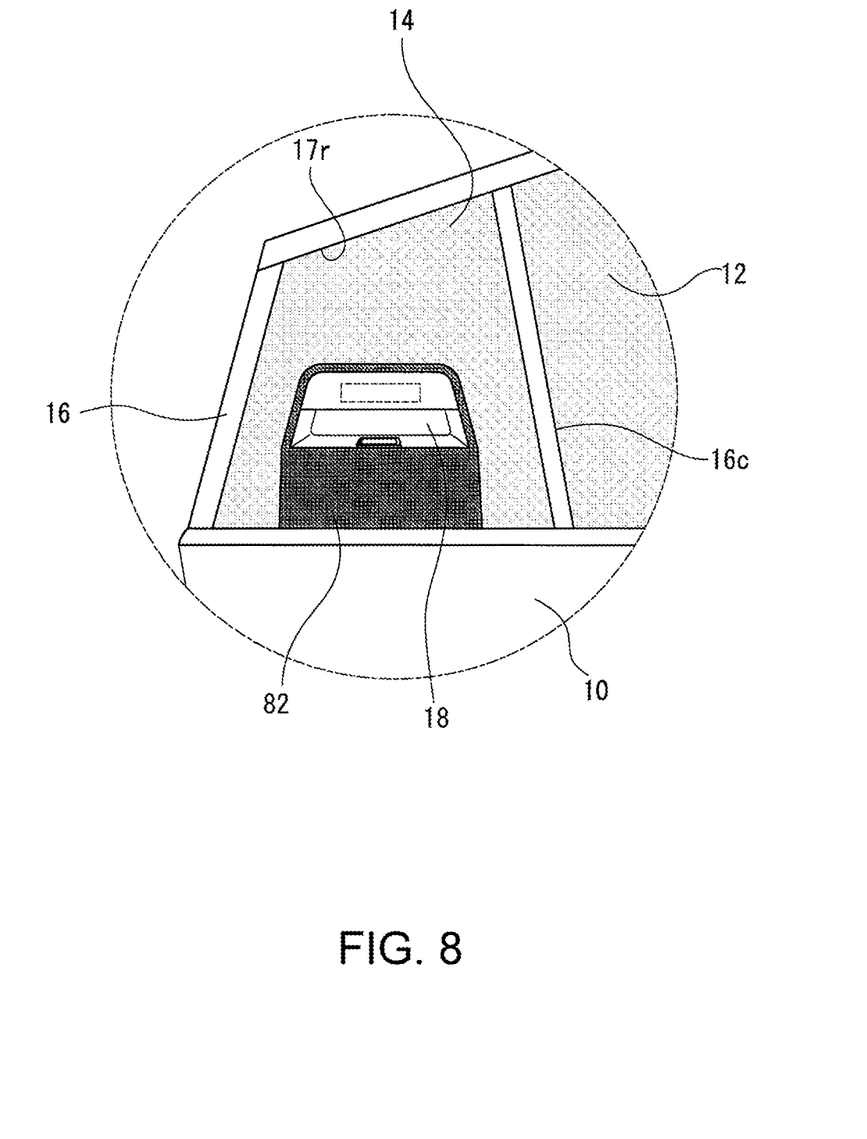
FIG. 8 is a diagram showing another example of an outside door handle.

The above-described configuration is simply one example. The configuration may be changed as appropriate so long as the vehicle side part structure includes: the outside door handle 18 which is arranged above the lower end rim 16b of the window frame 16 and which is manipulated when the side door 10 is being opened and closed from outside the vehicle; the release switch 38 which outputs a release signal upon being manipulated; and the latch actuator 72 which releases latching of the side door 10 by the latch mechanism 74 when the release signal is output, wherein the release switch 38 is provided on the press surface 35 of the outside door handle 18, which is a surface pressed by a user with a finger during an operation of opening the side door 10. For example, while according to the above description the outside door handle 18 is provided in the rear lower corner of the rear window opening 17r, the outside door handle 18 may alternatively be provided at other locations so long as the location is above the lower end rim 16b of the window frame 16. For example, as shown in FIG. 8, the outside door handle 18 may be provided in a central part of the rear window opening 17r. In that case, a resin molding 82 for hiding the signal line 78 and the transmission cable 50 extending from the outside door handle 18 may be provided.

REFERENCE SIGNS LIST 10 side door, 12 rising/lowering window glass, 14 fixed window glass, 16 window frame, 16a rear end rim of window frame, 16b lower end rim of window frame, 17f front window opening, 17r rear window opening, 18 outside door handle, 24 first panel, 26 second panel, 28 base part, 30 rear part, 31 front part, 32 placement part, 34 cover part, 35 press surface, 36 pocket space, 38 release switch, 40 emergency switch, 42 placement hole, 50 transmission cable, 56 bell crank, 58 transmission rod, 59 swing lever, 70 body ECU, 72 latch actuator, 74 latch mechanism, 78 signal line, 79 motive-power transmission member, 80 relay, 82 resin molding.

The invention claimed is:

1. A vehicle side part structure, comprising:
    a side door having a window frame;
    an outside door handle which is arranged above a lower end rim of the window frame and which is manipulated when the side door is being opened and closed from outside the vehicle;
    a release switch provided on a press surface of the outside door handle, which is a surface pressed by a user with a finger during an operation of opening the side door, the release switch outputting a release signal upon being manipulated;
    a latch actuator which releases latching of the side door by a latch mechanism when the release signal is output; and
    an emergency switch provided on the outside door handle, the emergency switch being mechanically coupled to the latch mechanism with a bell crank, the bell crank having one end in contact with the emergency switch and another end connected with a terminal end of a transmission cable, and serving to mechanically release the latching by the latch mechanism upon being manipulated, wherein the emergency switch is arranged flush within a placement hole formed in the outside door handle, and a main component of an operation direction of the emergency switch is in a vehicle vertical direction.

2. The vehicle side part structure according to claim 1, wherein the outside door handle comprises:

a base part extending in a direction substantially parallel to a window glass located adjacent to the outside door handle; and a cover part which is located outward in a vehicle width direction from the base part and which defines, between the cover part and the base part, a pocket space into which a user's finger is inserted, wherein the press surface is a surface of the cover part that faces the base part.

3. The vehicle side part structure according to claim 2, wherein the outside door handle is arranged in a rear lower corner of a window opening surrounded by the window frame, and the cover part is mounted to bridge between the lower end rim and a rear end rim of the window frame.

4. The vehicle side part structure according to claim 1, wherein the emergency switch is provided on the outside door handle at a portion adjacent to the window frame.

5. The vehicle side part structure according to claim 1, wherein during vehicle travel, a signal path between the release switch and the latch actuator is disconnected.

\* \* \* \* \*